Patented Mar. 24, 1936

2,035,122

UNITED STATES PATENT OFFICE 2,035,122

ARTICLES FABRICATED WITH ASPHALTENES AND METHOD OF MAKING SUCH ARTICLES

Stewart C. Fulton, Elizabeth, and Vladimir Kalichevsky, Gloucester, N. J., assignors to Standard Oil Development Company, a corporation of Delaware No Drawing. Application December 12, 1931, Serial No. 580,736

12 Claims. (Cl. 154—2)

This invention relates to improvements in the manufacturing of briquets, wall-boards and the like to make them suitable for heat and electrical insulating and other purposes. The invention also includes the compositions so prepared.

In accordance with the present invention asphaltenes separated from petroleum oils are used. Non-mineral constituents present in petroleum, soluble in carbon disulphide and substantially insoluble in 88° A. P. I. naphtha are known as asphaltenes. Asphaltenes are generally believed to be formed by the addition of oxygen or sulphur to resins present in petroleum. They are also believed to be formed by dehydrogenation with or without intramolecular changes taking place in part of the petroleum resins upon heating them in air. Generally the asphaltenes derived from asphalts are characterized by the high percentages of sulphur (7 to 13 per cent) and under the influence of light are converted into insoluble modifications. In some cases, however, the percentage of sulphur may be lower, for example as in asphaltenes formed during the cracking of oil. The asphaltenes and their parent substances, the asphaltic resins, are regarded as saturated polycyclic compounds containing sulphur and oxygen, either of which can replace the other. In most cases asphaltenes are produced by heating the unstable fraction of asphaltic resins under oxidizing conditions, this being accompanied by a darkening in color and gradual decreasing solubility in petroleum naphtha.

The process of manufacturing wall-boards and the like is as follows:

Asphaltenes alone or with the addition of suitable binders such as inorganic binders, namely, plaster of Paris, cement, magnesium oxide, etc. or organic binders, namely molasses residue (e. g. "black strap") combined with lime, albuminoids, including glues and gelatines, proteins in combination with alkali (i. e. alkaline caseinates, albumens), etc., with or without a quantity of lubricating oil are placed in layers between layers of cloth such as burlap or cotton and subjected to a pressure of 2000 pounds to a square inch. Any of the foregoing inorganic or organic binding agents may be used alone, although various combinations are used whereby a saving is effected and more efficient results are obtained. For example, plaster of Paris may be used alone but a combination of plaster of Paris and glue with the asphaltenes has been found to be more efficient.

Briquets are prepared by the following methods: Asphaltenes together with one or more of the binders described above are mixed with cotton waste, wood shavings, asbestos, straw, hair, or any other suitable fibrous material. The mixture is then placed in molds and subjected to a pressure of about 2000 pounds to a square inch.

The exact proportions of the materials to be used are not material inasmuch as they may be varied over a wide range, depending upon the properties of the raw materials used and those of the finished product desired, as is well known to those skilled in the art. However, for the sake of illustration, it might be noted that 2 to 30% of asphaltenes may be used in preparing a hard wallboard according to the method described above, while for the manufacture of briquets a somewhat larger proportion of asphaltenes may be used, such as 20 to 70%.

The finished product of compressed asphaltenes with the suitable binders, are now used as a means of heat or electrical insulating. Ice refrigerators may be lined with these briquets. The wall-boards may be used in lining the walls of a house or to form ceilings and also partitions between the rooms. They are nailed directly to the wooden beams and take the place of lath and plaster. The efficiently of asphaltene prepared briquets and wallboards as to heat insulating properties compares favorably to that of cork, being equal, if not superior, for the same thickness of material used. The extent of compression has only a slight effect as to the insulating properties.

Various changes and alternative procedures may be adopted within the scope of the appended claims, in which it is our intention to claim all novelty inherent in the invention as broadly as the prior art permits.

We claim:

1. The process of manufacturing wall-boards and the like, comprising the mixing of asphaltenes with a suitable binder, placing the mixture of asphaltenes and binder in layers between layers of cloth and subjecting the layers to pressure.

2. The process of manufacturing briquets, comprising the mixing of asphaltenes with suitable binders and a fibrous material, placing the said mixture into molds and subjecting to pressures.

3. The process of manufacturing briquets, wall-boards and the like suitable for heat and electrical insulating purposes, comprising the incorporation of asphaltenes with suitable binders and a fibrous material and subjecting the said mixture to pressure.

4. Process according to claim 3, in which the binders used are albuminoids, including glues and gelatines.

5. Process according to claim 3, in which the fibrous material used is cotton waste.

6. Process according to claim 3, in which the pressure used is about 2000 pounds per square inch.

7. A briquet, composed of asphaltenes, suitable binders and fibrous material.

8. A wall-board, composed of layers of asphaltenes, binding material and layers of cloth.

9. A wall board, composed of layers of asphaltenes, lubricating oil, binding material and layers of cloth.

10. A process of manufacturing useful products from asphaltenes, which comprises mixing said asphaltenes with a fibrous material and molding the mixture under pressure.

11. Process according to claim 10, in which a binder is added to the mixture.

12. Process of manufacturing compressed and shaped articles from petroleum residues, which comprises separating asphaltenes from said petroleum residues, mixing said asphaltenes with a fibrous material with or without a suitable binder, and compressing the mixture into the desired shape.

STEWART C. FULTON.
VLADIMIR KALICHEVSKY.